(12) United States Patent
Humer et al.

(10) Patent No.: US 6,631,955 B2
(45) Date of Patent: Oct. 14, 2003

(54) VARIABLE MOVEMENT HEADREST ARRANGEMENT

(75) Inventors: Mladen Humer, East Pointe, MI (US); Yan Fan, Bloomfield, MI (US); Magnus Roland, Vänersborg (SE)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/184,698

(22) Filed: Jun. 28, 2002

(65) Prior Publication Data

US 2003/0011224 A1 Jan. 16, 2003

Related U.S. Application Data (60) Provisional application No. 60/302,016, filed on Jun. 29, 2001, provisional application No. 60/302,019, filed on Jun. 29, 2001, and provisional application No. 60/302,024, filed on Jun. 29, 2001.

(51) Int. Cl.[7] ................................................. A47C 1/10
(52) U.S. Cl. ................... 297/408; 297/410; 297/216.12
(58) Field of Search ........................... 297/216.12, 410, 297/408

(56) References Cited

U.S. PATENT DOCUMENTS

| | | | |
|---|---|---|---|
| 2,636,552 A | | 4/1953 | Long |
| 2,869,622 A | * | 1/1959 | Petersen et al. ............. 297/396 |
| 3,586,366 A | * | 6/1971 | Patrick ........................ 297/391 |
| 3,802,737 A | | 4/1974 | Mertens |
| 3,838,870 A | | 10/1974 | Hug |
| 4,977,973 A | * | 12/1990 | Takizawa .................... 180/271 |
| 5,011,225 A | * | 4/1991 | Nemoto ....................... 297/408 |
| 5,145,233 A | | 9/1992 | Nagashima |
| 5,378,043 A | | 1/1995 | Viano et al. |
| 5,437,494 A | | 8/1995 | Beauvais |
| 5,505,520 A | | 4/1996 | Frusti et al. |
| 5,509,716 A | | 4/1996 | Kolena et al. |
| 5,795,019 A | | 8/1998 | Wieclawski |
| 5,927,804 A | * | 7/1999 | Cuevas ................... 297/216.12 |
| 6,019,424 A | * | 2/2000 | Ruckert et al. ......... 297/216.12 |
| 6,022,074 A | | 2/2000 | Swedenklef |
| 6,024,406 A | * | 2/2000 | Charras et al. ......... 297/216.14 |
| 6,213,549 B1 | | 4/2001 | Wieclawski |
| 6,273,511 B1 | | 8/2001 | Wieclawski |
| 6,375,262 B1 | * | 4/2002 | Watanabe ................. 297/284.4 |
| 6,416,125 B1 | | 7/2002 | Shah et al. |
| 6,478,373 B1 | * | 11/2002 | Hake et al. ............. 297/216.13 |
| 6,485,096 B1 | * | 11/2002 | Azar et al. ..................... 297/61 |
| 6,523,892 B1 | * | 2/2003 | Kage et al. ............. 297/216.13 |

FOREIGN PATENT DOCUMENTS

| | | |
|---|---|---|
| DE | 23 37 521 | 2/1975 |
| FR | 2 590 529 | 5/1987 |
| FR | 2 602 133 | 2/1988 |
| FR | 2 680 484 | 2/1993 |
| JP | 49-25690 | 7/1974 |
| JP | 7-291005 | 11/1995 |
| WO | WO 87/03256 | 6/1987 |
| WO | WO 98/09838 | 3/1998 |

* cited by examiner

*Primary Examiner*—Peter M. Cuomo
*Assistant Examiner*—Sarah C. Burnham
(74) *Attorney, Agent, or Firm*—Bill C. Panagos (57) ABSTRACT

The present invention involves a method of providing head support with a movable headrest of a vehicle seat to a vehicle occupant head during impact of the vehicle. The method includes moving the headrest toward the head of the occupant in a first manner upon impact of the vehicle and moving the headrest toward the head of the occupant in a second manner different from the first manner. The first and second manners may include first and second velocities and first and second trajectories of the headrest.

16 Claims, 5 Drawing Sheets

VARIABLE MOVEMENT HEADREST ARRANGEMENT

CROSS-REFERENCE TO RELATED APPLICATIONS

This application claims the benefit of U.S. provisional application Ser. Nos. 60/302,016; 60/302,024; and 60/302,019, all filed on Jun. 29, 2001.

BACKGROUND OF THE INVENTION

1. Field of the Invention

The present invention relates to a variable movement headrest arrangement for providing support to the head of an occupant of a vehicle upon vehicle impact.

2. Background Art

Improvements in safety mechanisms in the automotive industry continue to be made year after year. Such safety mechanisms include safety headrests. Example safety seat headrests can be found in Viano et al., U.S. Pat. No. 5,378,043, which is incorporated herein by reference. Such safety headrest mechanisms provide support to the head of a vehicle occupant during crash situations.

More specifically, upon rear impact of a vehicle, the occupant of the vehicle compresses into the vehicle seatback, as the head, neck, and torso move substantially in unison. There typically is greater compression in the torso and buttocks regions than in the shoulder region of the occupant. Thus, it has been a concern that the seatback may possibly deflect under the torso and buttocks load before the head and neck of the occupant contacts the headrest attached to the seatback.

Upon front impact of a vehicle, an occupant of the vehicle moves forward relative to the vehicle seatback. Upon contact with a front interior panel or a deployed air bag from the front panel, the occupant experiences rebound movement in a rearward direction. Similar to a rear impact situation as described above, the occupant in such a situation would then provide a rearward load into the seatback and compress into the vehicle seatback, as the head, neck, torso, and buttocks move substantially in unison. Thus, in a front impact it is also a concern that the seatback may possibly deflect under the torso load prior to the head and neck of the occupant contacting the headrest.

As a result, safety headrest mechanisms have been designed such that, upon rear impact, the occupant's torso contacts an impact target of a vehicle seat with a rearward load or force. The impact target is operatively connected to a headrest cushion portion such that, upon the rearward load on the impact target, the headrest cushion portion moves forwardly toward the head of the occupant. The forward movement of the cushion portion in the crash situation lessens the gap which may exist between the head of the occupant and the headrest cushion portion, preventing or decreasing the risk of whiplash to the occupant.

However, it would be desirable to have the headrest arrangement move forward at a higher velocity to decrease the gap more quickly, but without contacting the occupant's head while moving at the higher velocity.

SUMMARY OF THE INVENTION

It is an object of the present invention to provide a cost effective mechanism to support the head of an occupant of a vehicle upon vehicle impact.

In carrying out the above object, and other objects and features of the invention, a new method of providing head support with a movable headrest of a vehicle seat to a vehicle occupant head during impact of the vehicle is provided. The method comprises moving the headrest toward the head of the occupant in a first manner upon impact of the vehicle, and moving the headrest toward the head of the occupant in a second manner different from the first manner.

In a more specific embodiment, the first manner in which the headrest is moved has a first forward velocity and the second manner in which the headrest is moved has a second forward velocity different from the first velocity. The first forward velocity may be greater than the second forward velocity.

In another more specific embodiment, the first manner in which the headrest is moved is along a first trajectory of the headrest and the second manner in which the headrest is moved is along a second trajectory of the headrest different from the first trajectory. The second trajectory may be more upwardly than the first trajectory.

In another more specific embodiment, moving the headrest in the first manner employs an instant center axis which is lower than the instant center axis employed when moving the headrest in the second manner.

In another more specific embodiment, the method further comprises contacting the head of the occupant with the headrest during the second manner of moving the headrest.

In another more specific embodiment, the method further comprises reducing the forward velocity of the headrest prior to contact of the headrest with the head of the occupant.

In another more specific embodiment, the first manner in which the headrest is moved is a first arcuate path and the second manner in which the headrest is moved is a second arcuate path different from the first arcuate path. The headrest may move more forwardly along the first arcuate path than along the second arcuate path toward the head of the occupant. The headrest may move more upwardly along the second arcuate path than along the first arcuate path relative to the head of the occupant.

In another more specific embodiment, the first manner in which the headrest is moved has a first forward velocity and a first trajectory and the second manner in which the headrest is moved has a second forward velocity and a second trajectory and at least one of the first forward velocity and trajectory is different from the second forward velocity and trajectory respectively. The first forward velocity and trajectory may be different than the second forward velocity and trajectory respectively.

The method of providing head support with a movable headrest of a vehicle seat to a vehicle occupant head during impact of the vehicle may also comprise moving the headrest toward the head of the occupant at a first velocity upon impact of the vehicle, and moving the headrest toward the head of the occupant at a second velocity before the head of the occupant makes contact with the headrest, the first velocity being greater than the second velocity.

In another more specific embodiment, the method further comprises reducing movement of the headrest after movement of a predetermined distance and before the headrest contacts the head of the occupant to provide support.

The method of providing head support with a movable headrest of a vehicle seat to a vehicle occupant head during impact of the vehicle may also comprise moving the headrest toward the head of the occupant along a first trajectory and at a first forward velocity upon impact of the vehicle, and moving the headrest toward the head of the occupant along a second trajectory and at a second forward velocity before the head of the occupant contacts the headrest, one of the first trajectory and first forward velocity being different from one of the second trajectory and second forward velocity respectively. The first trajectory and first forward velocity may be different than the second trajectory and second forward velocity respectively. The method may also further comprise reducing movement of the headrest after movement of a predetermined distance and before the headrest contacts the head of the occupant to provide support.

DETAILED DESCRIPTION OF THE PREFERRED EMBODIMENTS

Figure 1:
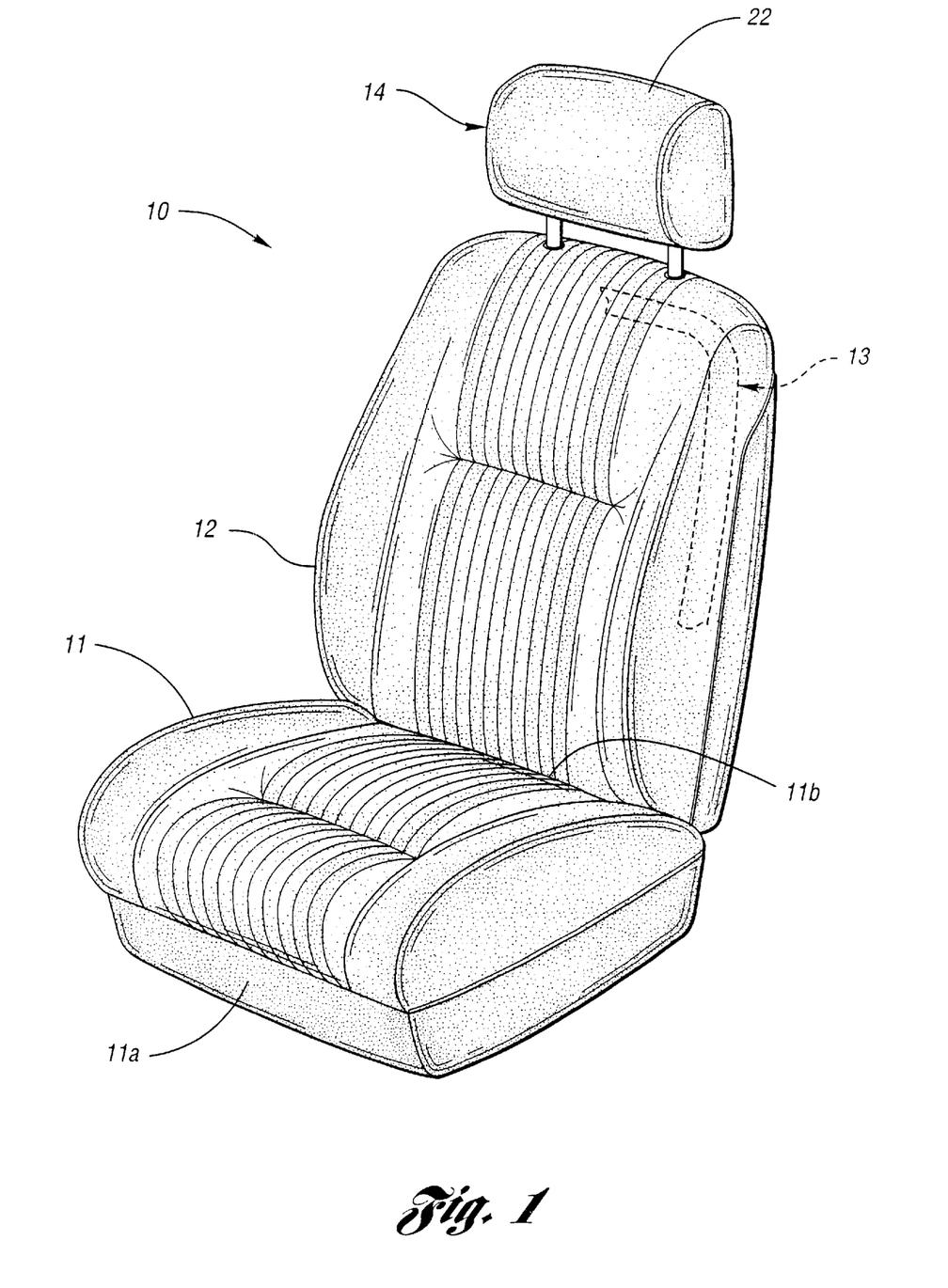
FIG. 1 is a perspective view of a vehicle seat and headrest arrangement in accordance with one embodiment of the present invention.

FIG. 1 illustrates a vehicle seat and headrest arrangement 10 having seat bottom 11 with fore end 11a and aft end 11b, seatback 12 with seatback frame 13 joined to seat bottom 11 adjacent aft end 11b, and headrest arrangement 14 pivotally and slidably attached to seatback frame 13. Headrest arrangement 14 includes moveable headrest 22 which, in this and in most typical embodiments, is cushioned. As will be described in greater detail below, headrest 22 moves variably upon vehicle impact. In the embodiment shown, such variable movement occurs in first and second manners wherein the first and second manners relate to first and second forward velocities respectively, those being the velocities of the headrest 22 forward toward the occupant or the front of the vehicle, and first and second trajectories respectively, those being the trajectories or paths of headrest 22. Such variable movement could be along any suitable combination of trajectories and velocities. As long as at least one of the first forward velocity and first trajectory is different than one of a second forward velocity and second trajectory, movement in first and second manners, variable movement, has been achieved.

However, as will be explained in more detail, in the event of a vehicle impact, it is preferable that the headrest move in a first manner so as to more quickly lessen the gap between the head of an occupant and the headrest 22 and move in a second manner so as to decrease the forward velocity and provide support upon contact with the occupant's head. More specifically, prior to impact of a vehicle in which the seat is located, headrest 22 is in a normal position. In the embodiment shown, upon impact of the vehicle, headrest 22 moves at first and second forward velocities and in first and second trajectories. First, the headrest 22 moves at the first forward velocity and in the first trajectory to quickly decrease any gap between the head of an occupant and the headrest portion 22. Then, the headrest 22 moves at the second forward velocity and in the second trajectory such that the velocity of the headrest 22 movement relative to the head of the occupant of the seat is decreased and so as to provide support to the occupant's head upon contact with the headrest 22.

Figure 2:
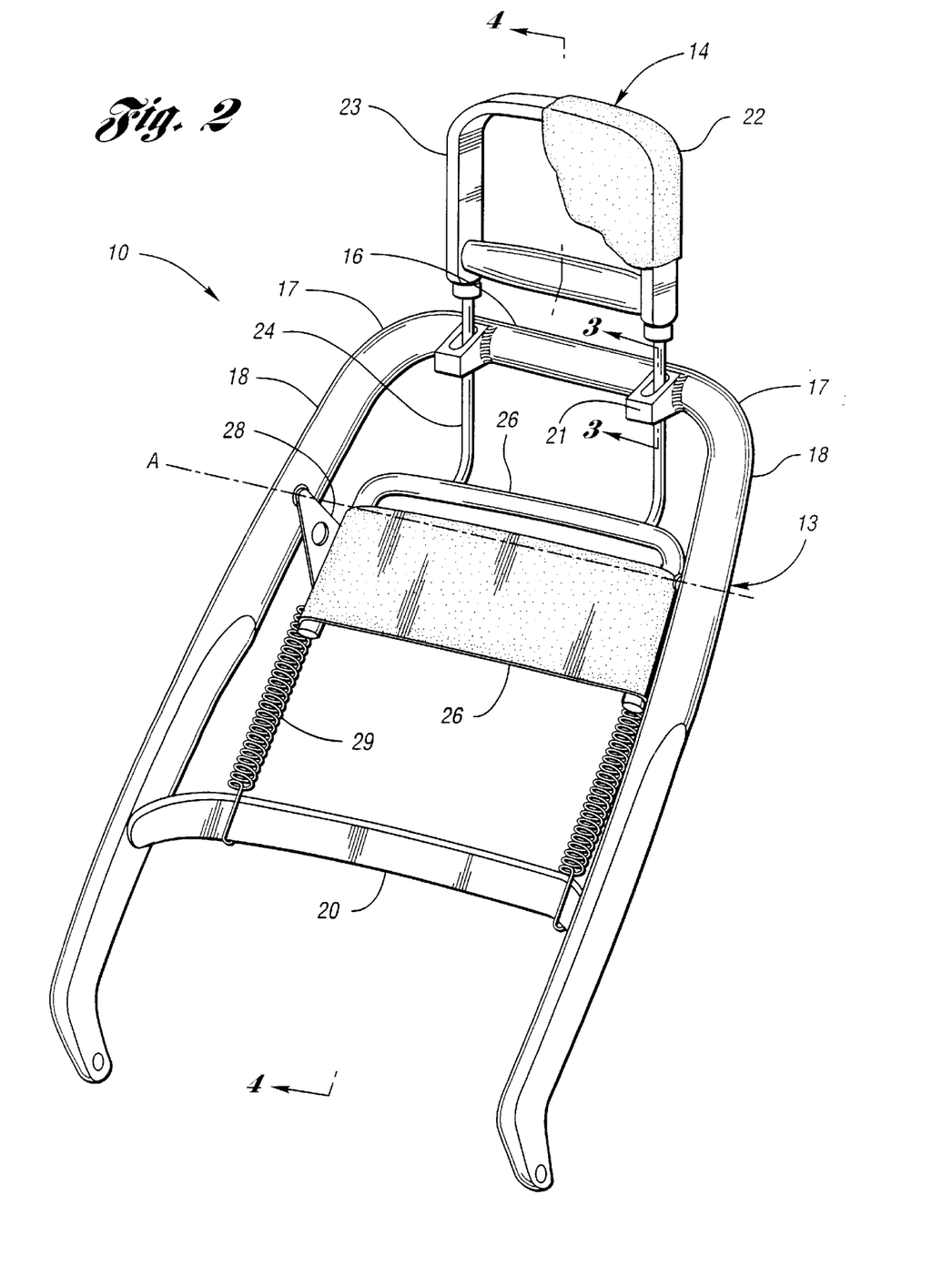
FIG. 2 is a perspective view of a variable pivot mechanism for a headrest on a seatback frame in accordance with one embodiment of the present invention.

FIG. 2 depicts headrest arrangement 14 pivotable with respect to seatback frame 13. As shown, seatback frame 13 includes upper cross member 16 having ends 17, each of which has a side member 18 integrally attached thereto and extending downwardly therefrom. Lower cross member 20 extends across seatback frame 13 to connect side members 18. Lower cross member 20 may be attached to side members 18 by any suitable means, such as by welds or bolts (not shown).

In this embodiment, the upper cross member 16 includes at least one guide member, in this embodiment bushings 21. Such bushings may be attached to the cross member 16 or formed within the cross member 16. While not shown, the guide members could also be connected to any part of the seatback frame. Furthermore, the guide members, such as the bushings 21 shown, may be fixedly, rotatably, or otherwise movably connected to seatback frame 13 by any suitable means. In this embodiment, bushings 21 are welded to upper cross member 16.

As shown, headrest arrangement 14 includes headrest 22 having cushion frame 23, headrest extension 24 extending downwardly therefrom, and impact target 26 to which extension 24 extends. The impact target 26 may have any suitable configuration or shape and may be made from any suitable material. In this embodiment, impact target 26 is disposed within seatback frame 13 and between side members 18. The headrest 22 and impact target 26 are operatively associated as the headrest arrangement 14 moves variably with respect to the seat back frame 13. As described in greater detail below, headrest arrangement 14 cooperates with seatback frame 13 to define shifting axes about which headrest arrangement 14 pivots.

Figures 3, 4:
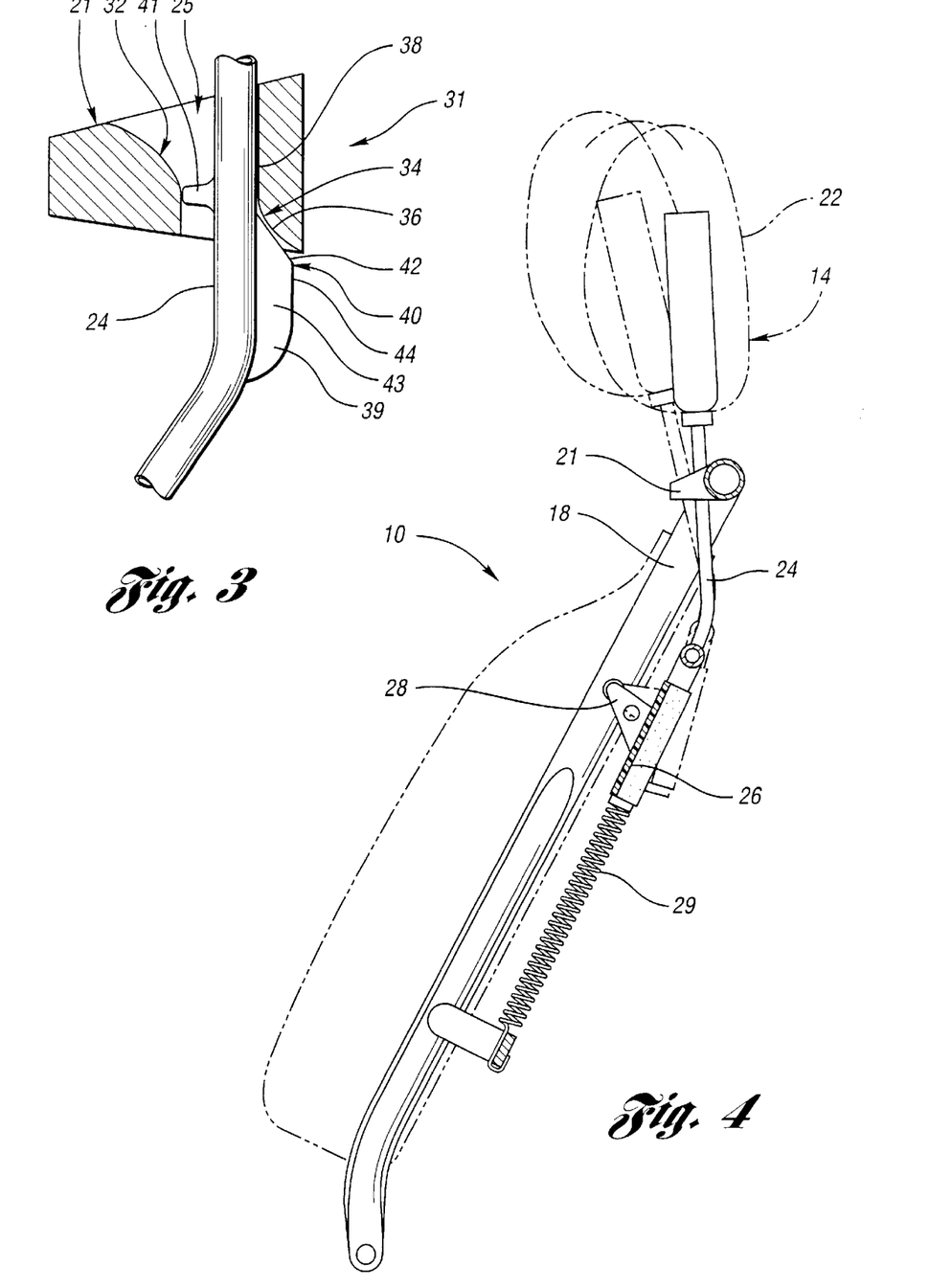
FIG. 3 is a cross-section view of the variable pivot mechanism for the headrest of FIG. 2 taken along lines 3—3.
FIG. 4 is a side view showing movement of the headrest upon impact in accordance with the present invention.

As depicted in FIGS. 2 and 3, headrest extension 24 extends downwardly from cushion frame 23 through each guide member, in this embodiment bushings 21, to an impact target 26. Each guide member defines a guideway, in this embodiment guideway 25. As shown, the headrest extension 24 in this embodiment constitutes two posts. However, a single post or any other suitable extension may be utilized. Likewise, a single guide member or any other suitable number of guide members may be utilized. Furthermore, while not shown the headrest extension of the headrest arrangement could include or constitute an upper portion or part of the seatback frame such that the upper portion or part could move variably.

As shown in this embodiment, one or more movement-allowing connectors 28, such as links or hinges shown, may be used to pivotally or otherwise suitably attach impact target 26 to side members 18. Such movement-allowing connectors 28 may be connected at each end to the impact target 26 and side member 18 respectively, in a pivotal, fixed, or otherwise suitable manner. More specifically, as shown in the embodiment depicted, each of the movement-allowing connectors 28 may be pivotally attached to the seatback frame 13 on pivot axis A generally perpendicular to the fore and aft direction. The other end of the movement-allowing connector may also be pivotally attached to the impact target 26. As shown in FIGS. 2 and 4, the pivot axis A is offset relative to the impact target 26 such that a rearward force applied to the impact target 26 will tend to cause the movement-allowing connector 28 to pivot about the pivot axis A and the impact target to move in a generally rearward and upward direction. Of course, any other suitable movement-allowing connector 28 between the impact target 26 and the side member 18, or between any suitable portion of the headrest arrangement 14 and the seatback frame 13, could be used, such as multiple linkages for example, such that the impact target pivots about a fixed or variable (instantaneous) pivot axis.

Rearward loading of impact target 26 will cause headrest 22 to pivot toward the head of the occupant. Preferably, a suitable biasing member is operatively associated with the seatback frame 13 and headrest arrangement 14 in order to bias headrest arrangement 14 against such movement. As shown in this embodiment, such biasing member may consist of springs 29 attached between the lower cross member 20 and each link 28. However, such biasing member may be operatively associated with or between the seatback frame 13 and headrest arrangement 14 in any suitable manner. Furthermore, while in this embodiment, spring 29 is a metallic coil, any suitable biasing member, such as an elastic tube, may be used.

As shown in FIG. 3, in one embodiment of the present invention the guide member, in this embodiment the bushing 21, includes a guideway 25, which in this embodiment includes a cam configuration 31 having a first movement portion and a second movement portion, the operation of which is described in paragraphs below. While the guideway 25 in this embodiment has a first movement portion and a second movement portion, the guideway 25 is not limited to such a configuration but may have any suitable configuration. Furthermore, the guide member could utilize a slot or any other suitable configuration in guiding the follower as will be explained.

The cam configuration 31 in this embodiment includes a first guideway wall 32 and a second guideway wall 34. As shown, second guideway wall 34 may have first contact portion 36 and second contact portion 38 formed vertically adjacent each other and integrally connected. In this embodiment the first guideway wall 32 has a relatively curved surface configuration while the first contact portion 36 and second contact portion 38 of the second guideway wall 34 has a relatively curved surface configuration and a relatively flat surface configuration respectively. Of course, any other suitable configuration of the first and second guideway walls 32, 34 may be used. Likewise, any suitable configuration of first and second contact portions 36, 38, may be used.

As illustrated in FIG. 3, the follower 39, in this embodiment a cam 40, may be disposed on extension 24. Cam 40 may be disposed on extension 24 by any suitable means such as by welding or molding. The follower 39, in this embodiment cam 40, cooperates with the guideway 25 of the guide member, in this embodiment the bushing 21 having a cam configuration 31 with a first guideway wall 32 and second guideway wall 34. While the follower in this embodiment is a cam, any other suitable follower configuration could be utilized, such as a projection projecting laterally from the extension 24 and engaging a slot or other suitable configuration of the guide member. Furthermore, while in this embodiment the follower is connected to the extension 24 and the guide member is connected to the seatback frame 13, the follower could also be connected to the seatback frame 13 and the guide member could be connected to the extension 24.

The follower, in this embodiment the cam 40, has a first follower portion 41 and a second follower portion 43. The second follower portion 43 includes a first surface portion 42 and a second surface portion 44 formed vertically adjacent each other and integrally connected. First surface portion 42 may have a relatively flat surface configuration which extends at an angle from and relative to extension 24, to slidably cooperate with first contact portion 36 of second guideway wall 34. However, any other suitable first surface configuration may be used. While an angle of approximately 30 degrees between the first surface portion 42 and the extension 24 has been found to be satisfactory, any suitable angle may be used.

Second surface portion 44 may have a relatively flat surface configuration as shown. In this embodiment, the second surface portion 44 slidably cooperates with second contact portion 38. While the first and second surface portions 42, 44 have been shown in this embodiment to have relatively flat surface configurations, any other suitable surface configurations may be used.

As shown, and as discussed in further detail below, in this embodiment the first and second surface portions 42, 44 slidably contact first and second contact portions 36, 38, respectively, to provide improved head support to the occupant upon vehicle impact. Of course, first surface portion 42 may also slidably contact second contact portion 38 and second surface portion 44 may also slidably contact first contact portion 36 without departing from the spirit or scope of the present invention.

As shown in FIGS. 1–4, in this embodiment the first follower portion 41 extends from extension 24 opposite first and second surface portions 42, 44 to slidably contact the first guideway wall 32. While the first follower portion 41 has been shown in this embodiment to have an arcuately-topped protrusion configuration, any other suitable configuration may be used. During normal use of the vehicle seat and headrest arrangement 10, the first follower portion 41 serves to prevent the extension 24 from shifting back and forth, and to provide a substantially snug fit within the guide member, in this embodiment the bushing 21.

However, upon vehicle impact, first and second follower portions 41, 43 and first and second guideway walls 32, 34, are configured to cooperate together to move headrest 22 in first and second manners, e.g., first and second forward velocities and first and second trajectories of headrest 22. More specifically, upon impact of the vehicle, an occupant of the vehicle provides rearward load on impact target 26. In turn, connectors 28 pivot about axis A and the impact target 28 moves in a generally rearward and upward direction. As a result, extension 24 slides upwardly through the guideway 25 of the guide member, in this embodiment the bushing 21, and first surface portion 42 slides along first contact portion 36, and first follower portion 41 slides along first guideway wall 32. This movement, movement in the first manner, defines the first forward velocity and first trajectory of headrest 22 toward and relative to the occupant's head. This movement also defines the first movement portion. More specifically, this movement in the first manner causes the headrest 22 of the headrest arrangement 14 to pivot with respect to the seatback frame 13 along a first trajectory about and above a constant or shifting axis. The first trajectory and the force of the impact define a first forward velocity of the headrest 22 toward the head of the seat occupant.

Then, the second surface portion 44 slides along second contact portion 38, as follower portion 41 continues to slide along and past first guideway wall 32. This movement, movement in the second manner, defines the second velocity and second trajectory of headrest 22 toward and relative to the occupant's head. This movement also defines the second movement portion. More specifically, this movement in the second manner causes the headrest 22 of the headrest arrangement 10 to pivot with respect to the seatback frame 13 along a second trajectory about and above a constant or shifting axis. The second trajectory and the force of the impact define a second forward velocity of the headrest 22 toward the head of the seat occupant.

Each of the constant or shifting axes is the pivot axis, also called the instant center axis, instantaneous pivot axis, or instantaneous axis, about which the headrest 22 pivots at any given time during movement along a particular trajectory.

In the embodiments shown, the pivot axis, also called the instant center axis, instantaneous pivot axis, or instantaneous axis, about which the headrest portion pivots shifts throughout the trajectories of the headrest 22 during a rearward loading of the impact target. Shifting the instantaneous axis downwardly allows the headrest 22 to move in a more forwardly direction toward the occupant's head upon a rearward force to the impact target. Preferably, the vehicle seat and headrest arrangement is such that the instantaneous axis shifts within a relatively lower range of positions during camming between the first surface portion 42 and the first contact portion 36. The resulting trajectory is such that the headrest 22 will move in a direction more directed toward the occupant's head during the course of the first trajectory. Shifting the instantaneous axis upwardly, within a relatively higher range of positions, after the movement in the first manner has been accomplished, allows the headrest 22 to move more upwardly, and support the occupant's head, during movement in the second manner. In the embodiments shown, the cam is formed such that the instantaneous axis shifts upwardly upon contact of the second surface portion with the second contact portion 38.

In summary, upon vehicle impact, the headrest 22 moves forwardly and upwardly in first and second manners, along first and the second trajectories, and at first and second forward velocities. The greater the crash acceleration, the greater the velocity of headrest 22 in the first and second manners.

Although both trajectories provide for both forward and upward movement of the headrest 22, the first trajectory allows the headrest 22 to move more forwardly and the second trajectory allows the headrest 22 to move more upwardly. The first forward velocity is preferably greater than the second forward velocity. The first forward velocity allows the headrest 22 to quickly move a predetermined distance to lessen the gap between the occupant's head and the headrest 22. The second velocity allows the headrest 22 to further lessen the gap and to slow down or stop relative to the seat occupant's head for supporting the occupant's head upon contact.

In this particular embodiment, headrest 22 moves in a forward and upward direction for a predetermined distance toward the occupant's head in order to lessen the gap therebetween. More specifically, during movement of the headrest 22 in the first and second trajectories, the headrest 22 is configured to move forward a predetermined distance. While a distance range between 2 and 25 centimeters may be suitable, any suitable distance may be used and will be dependent, at least in part, on the interior design parameters of the particular vehicle.

In the particular embodiment shown, due to the configuration of the first surface portion 42 and the first contact portion 36, the headrest 22 moves more forwardly than upwardly to define the first trajectory, providing the first forward velocity. Due to the configuration of the second surface portion 44 and the second contact portion 38, the headrest 22 moves more upwardly than forwardly to define the second trajectory, providing the second forward velocity. Thus, in this embodiment, the first forward velocity is greater then the second forward velocity in the direction toward the head of the vehicle occupant. Accordingly, surface portions 44, 46 and contact portions 36, 38 are designed to reduce headrest 22 movement directly toward the occupant's head after movement in the first manner.

In normal vehicle seat and headrest arrangements, during the initial stages of an impact, the occupant's torso is in contact with the seatback while the occupant's head is several inches forward of the headrest 22. This condition is consistent with the body being reclined at about 20–25 degrees from vertical with the neck being approximately vertical. In contrast, the seat is usually at a reclined angle of approximately 20–25 degrees from vertical, with the headrest either following the inclination of the seatback or curving slightly forward. In any event, for seating comfort, the head is usually not in contact with the headrest while driving.

As the occupant loads the seatback in an impact, force builds up behind the torso and buttocks of the seat occupant as the head, neck, torso, and buttocks move in unison. Typically, there is a greater compression in the torso and buttocks regions of the seat, with a gradual reduction up to the shoulder level as the body remains upright. The more severe the crash, the greater the compression of the occupant into the seatback. As this action is occurring, the initial load of the occupant tends to deflect the seatback rearwardly. The amount of deflection is related to the bending stiffness of the seatback. The seatback may possibly deflect under the torso load prior to the head and neck of the occupant contacting the headrest. The current invention reduces this "whiplash" effect by bringing the headrest forward into a head supporting position.

Figure 5:
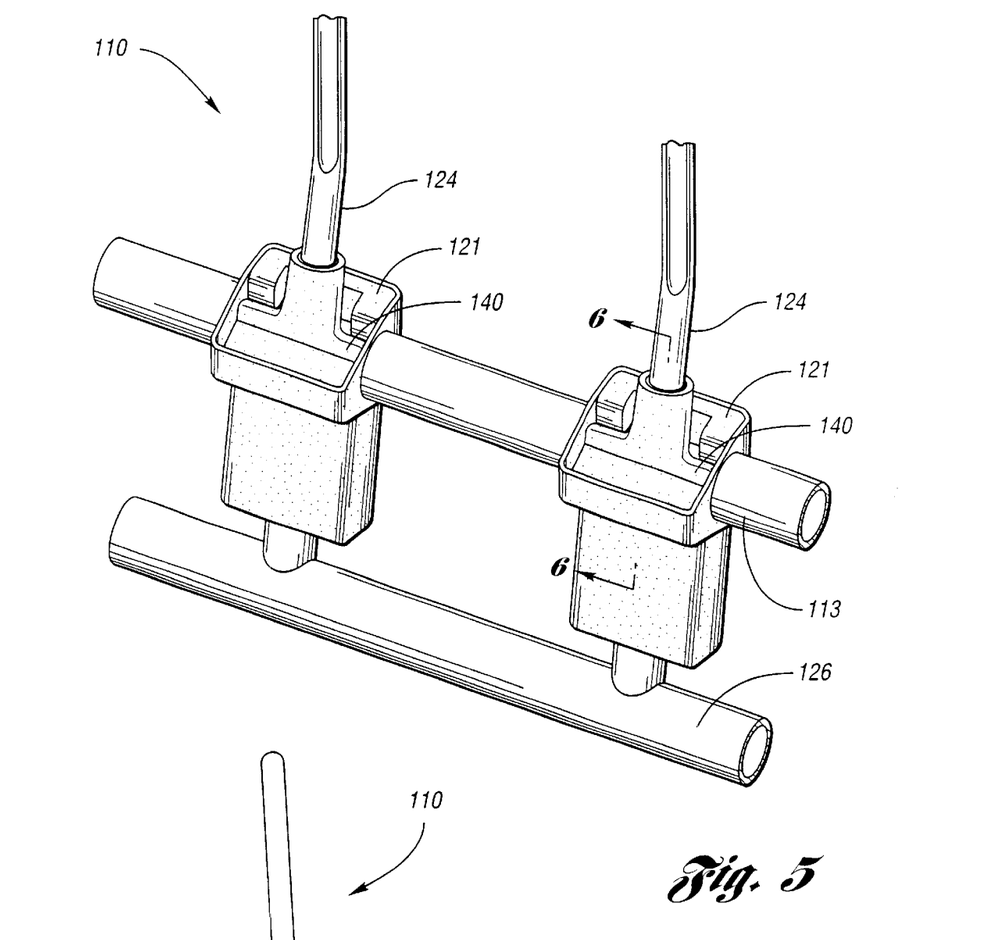
FIG. 5 is a perspective view of another embodiment of the variable pivot mechanism in accordance with the present invention.
Figure 6:
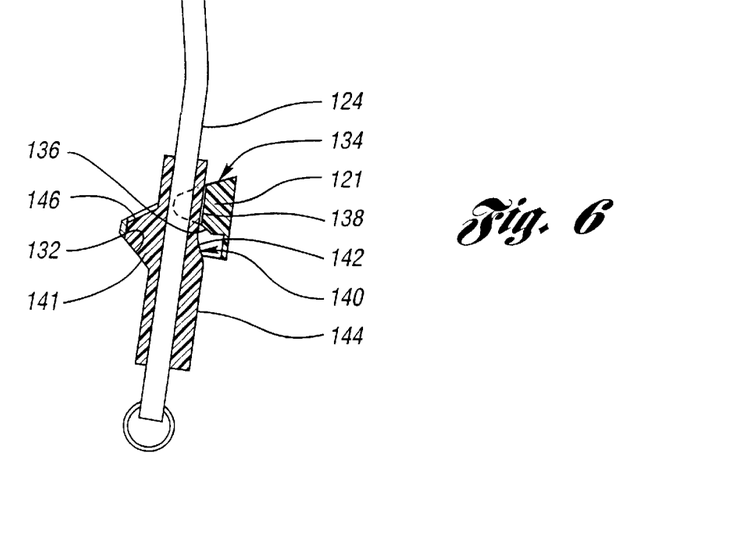
FIG. 6 is a cross-sectional view of the embodiment in FIG. 5 taken along lines 6—6.

FIGS. 5 and 6 depict another embodiment which operates similar to the embodiment described above. This embodiment includes components similar to components of vehicle seat and headrest arrangement 10 above. Similar components will be referred to by the same reference characters used to identify like components in the first embodiment. However, in this embodiment, a different guide member, bushing 121, is disposed on seatback frame 113 and includes a first guideway wall 132 and second guideway wall 134 having a pair of first and second contact portions 136, 138. A follower, in this embodiment a cam 140, is disposed on extension 124 and includes a pair of first and second surface portions 142, 144 formed to cooperate with the pair of first and second contact portions 136, 138, respectively. As shown, the first guideway wall 132 includes a planar surface upon which a first follower portion 141 slides during movement of the headrest arrangement 114. Similar to the embodiment described above, the first and second surface portions 142, 144 slidably contact the first and second contact portions 136, 138, respectively, to define first and second forward velocities and first and second trajectories of the headrest 22 during vehicle impact and to accordingly provide improved head support to the occupant upon vehicle impact.

While not shown, as a further alternative example embodiment, the invention may be constructed such that the impact target 26 is not connected to the side member 18. In such an embodiment, the impact target could be supported in the non-impact position via a guide member and follower for example.

It is to be noted that the embodiments described above may be made by any conventional means using any conventional materials known in the vehicle seating art.

Figure 7:
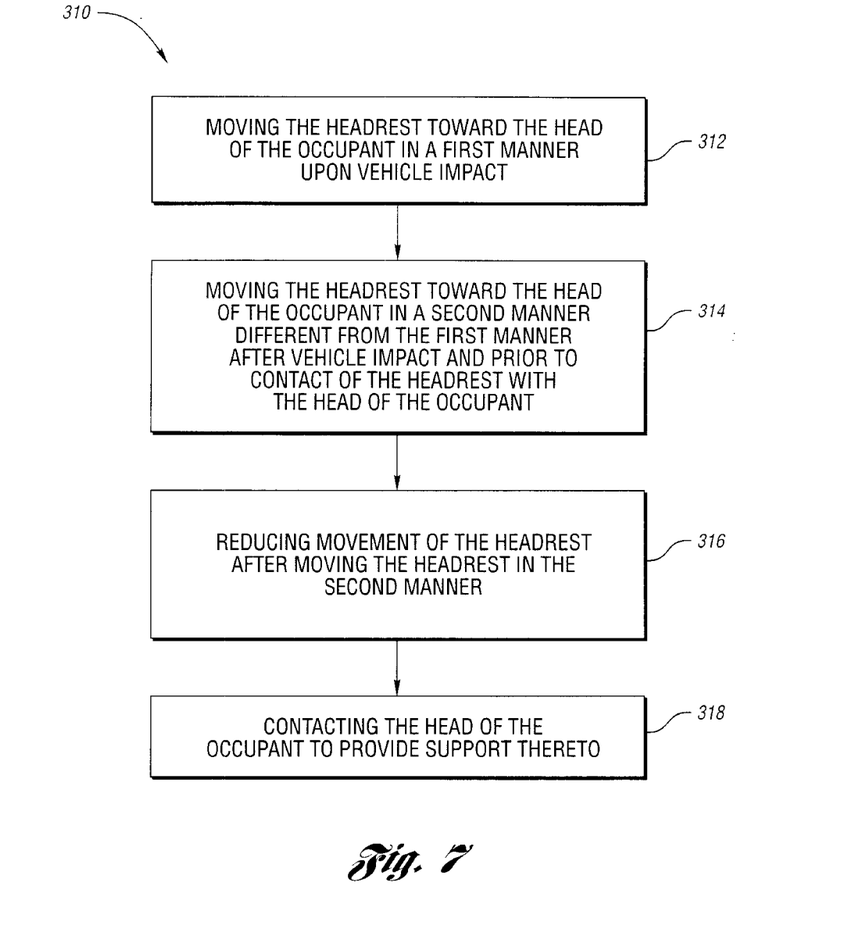
FIG. 7 is a flow chart of one method of providing head support with a movable headrest of a vehicle seat to a vehicle occupant head during impact of the vehicle.

FIG. 7 depicts a method 310 of providing head support to an occupant of a vehicle during impact of the vehicle. Method 310 includes moving the headrest toward the head of the occupant in a first manner upon vehicle impact in block 312. A resulting rearward force of the occupant contacting the impact target initiates movement of the headrest in the first manner, such as a first trajectory and a first forward velocity as described above. Then, in block 314, method 310 includes moving the headrest toward the head of the occupant in a second manner, along second trajectory and at a second forward velocity, different from the first manner. The second manner includes a second trajectory and a second forward velocity of the headrest. It is preferred that the first trajectory is directed more forwardly than the second trajectory, and the first forward velocity is greater than the second forward velocity. Method 310 further includes reducing movement of the headrest after moving the headrest in the second manner, preferably prior to contact with the occupant's head, in block 316. Although the headrest may contact the occupant's head while moving along the second trajectory, it is preferred that the headrest is at a reduced velocity or stationary upon contact with the head. Furthermore, in block 318, method 310 includes contacting the occupant's head to provide support, lessening whiplash to the occupant's head upon impact of the vehicle.

While embodiments of the invention have been illustrated and described, it is not intended that these embodiments illustrate and describe all possible forms of the invention as claimed. It is understood that various changes or modifications may be made without departing from the spirit and scope of the claimed invention.

What is claimed is:

1. A method of providing head support with a movable headrest of a vehicle seat to a vehicle occupant head during impact of the vehicle, the method comprising:

moving the headrest toward the head of the occupant in a first manner upon impact of the vehicle; and moving the headrest toward the head of the occupant in a second manner different from the first manner wherein the first manner in which the headrest is moved is along a first trajectory of the headrest and the second manner in which the headrest is moved is along a second trajectory of the headrest different from the first trajectory.

2. The method of claim 1 wherein the first manner in which the headrest is moved has a first forward velocity and the second manner in which the headrest is moved has a second forward velocity different from the first velocity.

3. The method of claim 2 wherein the first forward velocity is greater than the second forward velocity.

4. The method of claim 1 wherein the second trajectory is more upwardly than the first trajectory.

5. The method of claim 1 wherein moving the headrest in the first manner employs an instant center axis which is lower than the instant center axis employed when moving the headrest in the second manner.

6. The method of claim 1 further comprising contacting the head of the occupant with the headrest during the second manner of moving the headrest.

7. The method of claim 1 further comprising reducing a forward velocity of the headrest prior to contact of the headrest with the head of the occupant.

8. The method of claim 1 wherein the first manner in which the headrest is moved is a first arcuate path and the second manner in which the headrest is moved is a second arcuate path different from the first arcuate path.

9. The method of claim 8 wherein the headrest moves more forwardly along the first arcuate path than along the second arcuate path toward the head of the occupant.

10. The method of claim 8 wherein the headrest moves more upwardly along the second arcuate path than along the first arcuate path relative to the head of the occupant.

11. The method of claim 1 wherein the first manner in which the headrest is moved has a first forward velocity and the first trajectory and the second manner in which the headrest is moved has a second forward velocity and the second trajectory and at least one of the first forward velocity and trajectory is different from the second forward velocity and trajectory respectively.

12. The method of claim 11 wherein both the first forward velocity and trajectory are different than the second forward velocity and trajectory respectively.

13. The method of claim 1 further comprising reducing movement of the headrest after movement of a predetermined distance and before the headrest contacts the head of the occupant to provide support.

14. A method of providing head support with a movable headrest of a vehicle seat to a vehicle occupant head during impact of the vehicle, the method comprising:

moving the headrest toward the head of the occupant along a first trajectory and at a first forward velocity upon impact of the vehicle;

moving the headrest toward the head of the occupant along a second trajectory and at a second forward velocity before the head of the occupant contacts the headrest, one of the first trajectory and first forward velocity being different from one of the second trajectory and second forward velocity respectively.

15. The method of claim 14 wherein the first trajectory and first forward velocity are different than the second trajectory and second forward velocity respectively.

16. The method of claim 14 further comprising reducing movement of the headrest after movement of a predetermined distance and before the headrest contacts the head of the occupant to provide support.

* * * * *

Disclaimer 6,631,955 B2—Mladen Humer, East Pointe, MI (US); Yan Fan, Bloomfield, MI (US); Magnus Roland, Vänersborg (SE). VARIABLE MOVEMENT HEADREST ARRANGEMENT. Patent dated August 17, 1999. Disclaimer filed March 25, 2015, by the assignee, Maxim Integrated Products, Inc.

Hereby disclaims complete claim 6 of said patent.

*(Official Gazette, September 15, 2015)*